United States Patent
Kempf et al.

(10) Patent No.: US 9,491,063 B2
(45) Date of Patent: Nov. 8, 2016

(54) METHOD AND APPARATUS FOR PROVIDING NETWORK SERVICES ORCHESTRATION

(71) Applicant: TELEFONAKTIEBOLAGET L M ERICSSON (PUBL), Stockholm (SE)

(72) Inventors: James Kempf, Mountain View, CA (US); Ramesh Mishra, San Jose, CA (US); Ravi Manghirmalani, Fremont, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 494 days.

(21) Appl. No.: 13/895,141

(22) Filed: May 15, 2013

(65) Prior Publication Data

US 2014/0344439 A1 Nov. 20, 2014

(51) Int. Cl.
| | | |
|---|---|---|
| G06F 15/173 | (2006.01) | |
| H04L 12/24 | (2006.01) | |
| G06F 9/50 | (2006.01) | |

(52) U.S. Cl.
CPC ............ H04L 41/50 (2013.01); G06F 9/5072 (2013.01)

(58) Field of Classification Search
CPC .............................. G06F 9/5072; H04L 41/50
USPC ................................................. 709/223, 224
See application file for complete search history.

(56) References Cited

U.S. PATENT DOCUMENTS

| | | | | |
|---|---|---|---|---|
| 8,438,654 B1 * | 5/2013 | von Eicken | ............. | G06F 21/53 709/217 |
| 8,805,921 B2 * | 8/2014 | Deng | ...................... | H04L 67/42 709/201 |
| 9,183,031 B2 * | 11/2015 | Spiers | ................. | G06F 9/45558 |
| 2004/0064293 A1 | 4/2004 | Hamilton | | |
| 2004/0088405 A1 | 5/2004 | Aggarwal | | |
| 2007/0186011 A1 | 8/2007 | Batke et al. | | |
| 2008/0098454 A1 | 4/2008 | Toh | | |
| 2009/0094364 A1 | 4/2009 | Stevens et al. | | |
| 2010/0064357 A1 | 3/2010 | Baird et al. | | |
| 2010/0287019 A1 | 11/2010 | Guo et al. | | |
| 2011/0055817 A1 | 3/2011 | Noble et al. | | |
| 2011/0078303 A1 | 3/2011 | Li et al. | | |
| 2012/0290460 A1 * | 11/2012 | Curry, Jr. | ............... | G06Q 30/08 705/37 |

(Continued)

FOREIGN PATENT DOCUMENTS

| | | |
|---|---|---|
| EP | 0918412 A2 | 5/1999 |
| EP | 2 150 067 A1 | 2/2010 |
| EP | 2 518 937 A2 | 10/2012 |

OTHER PUBLICATIONS

"Network Function Virtualization; Management and Orchestration", 11, ETSI Standards, May 6, 2013, XP14152881, France, the whole document.

(Continued)

*Primary Examiner* — Mohamed Wasel

(57) ABSTRACT

A method and apparatus for providing network services orchestration are described herein. The apparatus comprises a network controller that runs a network services orchestration module. The network services orchestration module has a service management northbound application programming interface (API), an instance management submodule, an autoscaling and power management submodule, and an instance location southbound API. A steering module is also described herein that includes a steering northbound API and an instance location northbound API.

26 Claims, 9 Drawing Sheets

(56) References Cited

U.S. PATENT DOCUMENTS

| | | | |
|---|---|---|---|
| 2012/0311157 A1* | 12/2012 | Erickson | G06F 9/541 709/226 |
| 2013/0272305 A1 | 10/2013 | Lefebvre et al. | |
| 2013/0275596 A1* | 10/2013 | Subramaniam | H01L 41/04 709/226 |
| 2014/0236745 A1* | 8/2014 | Vautour | G06Q 30/0601 705/26.1 |
| 2015/0317169 A1* | 11/2015 | Sinha | H04L 61/2076 713/2 |

OTHER PUBLICATIONS

"Key Issues to Consider for Software Network Function Virtualization (NFV)—Software Architecture, Performance, Reliability & Orchestration", ETSI Standards, Jan. 15, 2013, XP14093911, France, the whole document.
"www.citrix.com/products/netscaler-application-delivery-controller/overview.html", Retrieved from internet on Jun. 14, 2013.
"Resource Management with VMware DRS, VMware Infrastructure", Revision 20061122 Version: 1.1, pp. 1-24.
"VMware Distributed Resource Scheduler (DRS)", Dynamic Load Balancing and Resource Allocation for Virtual Machines, pp. 1-3.
"DRS Performance and Best Practices", VMware Infrastructure 3, pp. 1-19.
Jin H. et al. "Dynamic Processor Resource Configuration in Virtualized Environments", Huazhong University of Science and Technology, Wuhan, China, pp. 1-8.
Zhao, W. et al. "Dynamic Memory Balancing for Virtual Machines", Mar. 11-13, 2009, pp. 1-10.
Mastelic T. et al., "M4Cloud—Generic Application Level Monitoring for Resource-Shared Cloud Environments", CLOSER 2012, 2nd International Conference on Cloud Computing and Services Science, Apr. 18, 2012, P055129872, Porto, Portugal, Retrieved from the Internet: URL:https://www.infosys.tuwien.ac.at/staff/ivona/papers/M4Cloud.pdf [retrieved on Jul. 17, 2014] Sec. 3 Sec. 3.1, Sec. 4-Sec. 5, figures 2, 3, 6, 7, 8.
Morgan R. et al., "Home-Sigar-Hyperic Support", Dec. 20, 2010, XP055130049, Retrieved from the Internet: URL:https://support.hyperic.com/display/SIGAR/Home [retrieved on Jul. 18, 2014], p. 1-p. 2.
Bovet D. et al., "Kernel Threads", In: "Kernel Threads", Jan. 1, 2006, XP055130069, ISBN: 978-0-59-600565 -8, pp. 123-126, p. 123-p. 126.

* cited by examiner

METHOD AND APPARATUS FOR PROVIDING NETWORK SERVICES ORCHESTRATION

FIELD

The present invention relates to providing network services orchestration. More particularly, the present invention relates to handling conflicting needs of network services for performance versus scale.

BACKGROUND

Cloud computing has introduced the concept of service orchestration. Service orchestration involves the following functions:
1) Placing and moving virtual machines (VMs) in particular locations that optimize the use of resources, such as server power consumption, bandwidth to the Internet, etc.
2) Starting, stopping, and pausing VMs that implement the service.
3) Arranging for network connectivity to the Internet and between the VMs implementing the service.
4) Arranging for load balancing by scheduling a load balancer to distribute the load and starting up additional service VMs if the load requires it.
5) Performing other functions involved in managing service VMs, their access to storage, and access networking.

The services "orchestrated" by cloud orchestration tools are typically end user services, like Web applications, ecommerce applications, etc.

Another class of services is network services. Network services perform operations on flows of packets in real time prior to the delivery of these packets to the end user or to end user services. Examples of such applications include load balancers for ensuring traffic loads are spread among service VMs, deep packet inspection (DPI) to check for flows that have security problems, firewalls to exclude particular kinds of traffic, media gateways for audio/video traffic, and Web proxies of various sorts, etc. These services often have real time performance requirements since they interpose on the delivery of packets between the source and destination, so a person is typically waiting for a response on the destination side. Often a chain of such services must be run on a packet flow, and different services must be run on different packet flows. For example, if a packet flow is identified as a YouTube video, DPI need not be run on it since the content is known and does not pose a security risk, but perhaps an ad insertion service might.

Present solutions to the network services orchestration problem involve one of three approaches:
1) If the network service is a hardware appliance, like a hardware load balancer, the software implementing management of the service may be delivered together with the hardware.
2) Managing network services as part of end user services orchestration. An example is including a load balancer VM as part of an end user service orchestration.
3) Requiring the network services to be virtual appliances and routing packets between them using encapsulation. Sometimes the service VMs must be wrapped in specialized wrappers. Orchestration is then possible for the virtualized appliances.

The problem with the first solution is that it does not allow for multiple services in the service chain. If the orchestration is tied to a single service, like load balancing, it becomes very difficult to include other services in the service chain. Complex routing solutions using access control lists (ACLS) must be programmed into the switches and routers, and if another service is a hardware service, rearranging the routing to reach the location of the hardware service may require manual intervention.

The problem with the second solution is that some network services are either not of interest to the designer of an end user service or need to be inserted by default. For example, the designer of an end user service should not need to be aware that DPI is running on their traffic, and therefore should not need to be responsible for including DPI in their service orchestration. The DPI service is both to protect the end user service and to protect the network operator.

The problem with the third solution is that it does not allow for hardware implementations for network services, nor for implementations that run on the bare metal with system software optimized for high performance packet forwarding because the services must run in VMs, and in some instances VMs packaged with specific agents. Because the services must be packaged as VMs, hardware-based services or services running on bare metal with optimized system software for packet processing are not usable.

What is needed, therefore, is a clean network services orchestration solution that can optimally place and manage a chain of network services, the ordering of which can differ depending on the particular flows that need processing, and can arrange for flows to be routed through the services in the proper order.

SUMMARY

A method and apparatus for providing network services orchestration is disclosed. In one embodiment, a network services orchestration module runs on a network controller. Service data is specified for a network operator using a service management northbound application programming interface (API). The specified service data can include at least one of service instance pools, service instances, and performance types.

Virtual machines (VMs) and specialized APIs are managed in response to operator requests from the service management northbound API using an instance management submodule. The hypervisor can be used to manage VMs implementing virtual appliances. A specialized API can be used to manage service instances. The managed service instances can be hardware based service instances or instances implemented on bare metal servers.

Statistics are monitored and service instances are affected using an autoscaling and power management submodule. Statistics can be monitored from hypervisors running virtual service appliances and switches. Affecting service instances can include scheduling new instances and shutting down instances having no load.

Changes in deployed network services instance availability are pushed to a steering module using an instance location southbound API. The instance location southbound API pushes the changes to an instance location northbound API of the steering module.

A service instance can be added to a pool of instances using the instance management submodule and load monitoring can be set up using the autoscaling and power management submodule.

Returned statistics can be compared to established upper and lower limits on a service pool using the autoscaling and power management submodule.

When a service instance is marked as overloaded, the instance management submodule can end an instance that is a hardware or bare metal instance. When the instance is a virtual appliance, the instance management submodule can start a new virtual appliance or increase a number of virtual machines.

The instance management module can delete a service instance when a number of flows is below a lower limit.

Also disclosed is a steering module. In one embodiment, the steering module includes a steering northbound API and an instance location northbound API. The steering northbound API allows subscriber-based and policy-based rules to be pushed down to the steering module. The instance location northbound API allows changes in deployed network services instance availability to be pushed down to the steering module by the network services orchestration module. The instance location northbound API provides identity, topological location, and performance type service data to the steering module. A flow steering southbound API is coupled to the steering module and pushes the rules and deployed network services instance availability to one or more switches.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DESCRIPTION OF EMBODIMENTS

Figure 1:
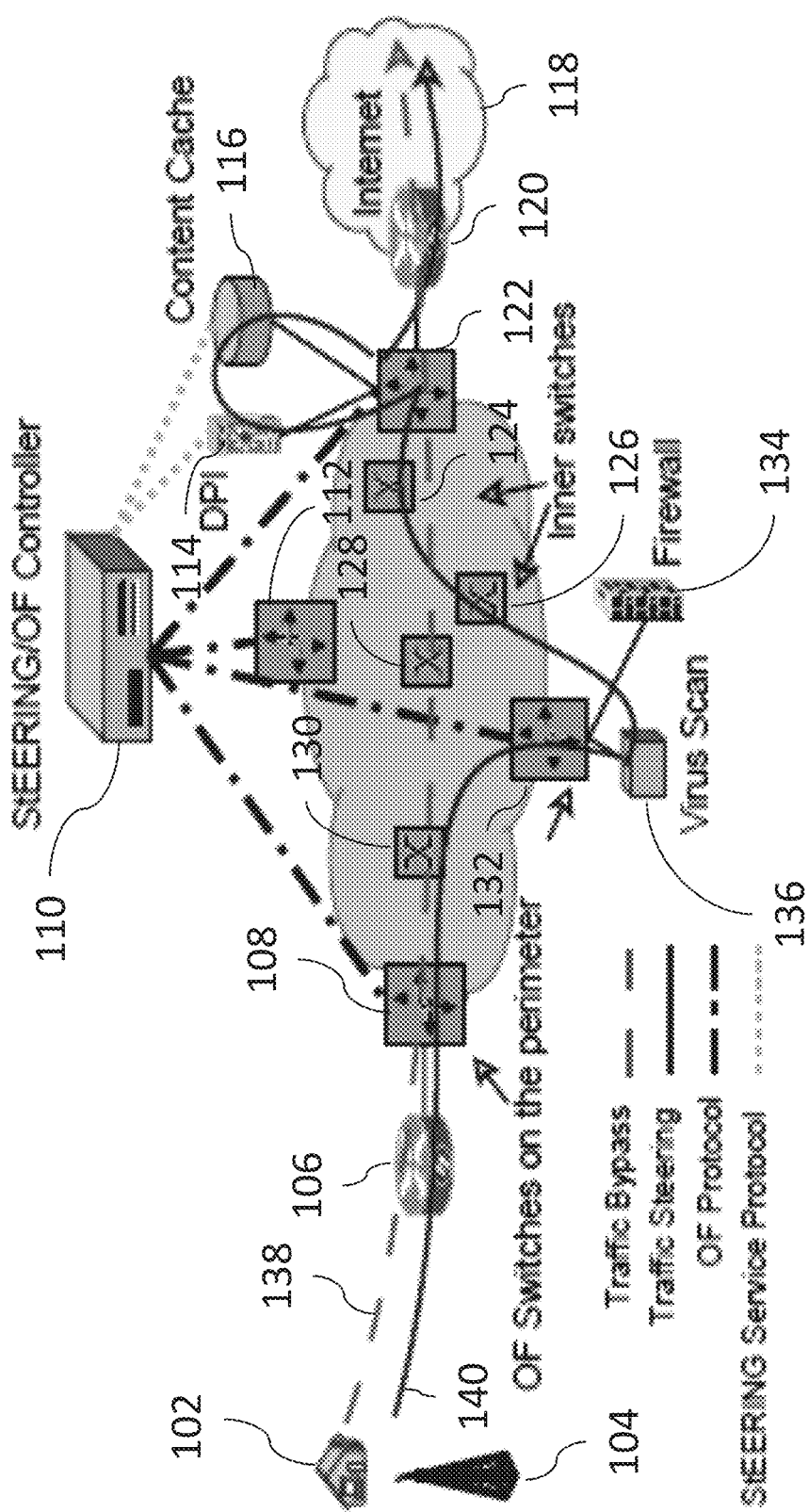
FIG. 1 illustrates a system for implementing software defined networking (SDN) inline services and forwarding, according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, tablets, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

FIG. 1 illustrates an example system for implementing SDN inline services and forwarding. Services 114, 116, 134, 136 are provided to subscribers 102, 104 using a plurality of perimeter switches 106, 112, 122, 132 and inner switches 124, 126, 128, 130. A logically centralized controller 110 is used to manage switches and middleboxes, e.g., services. In one embodiment, the logically centralized controller 110 is an Open Flow-based controller. In FIG. 1, two different service paths are shown. Service paths are set based on the subscriber, the application, and the required service order. Service paths are unidirectional, that is, different service paths are specified for upstream and downstream traffic. Service path 140 shows upstream traffic through Virus Scan 136, Deep Packet Inspection (DPI) 114 and Content Cache 116 before entering Internet 118 through perimeter switch 120. Service path 138 bypasses all of the services.

SDN inline services and forwarding architecture uses two different types of switches. The Perimeter Open Flow (OF) Switches 106, 112, 122, 132 are placed on the perimeter of the service delivery network. These switches classify the incoming traffic and steer this traffic towards the next service in the chain. OF switches 106, 112, 122, 132 are the switches to which services or gateway nodes are connected. The Inner Switches 124, 126, 128, 130 forward the traffic using efficient Layer 2 (L2) switching. Inner switches 124, 126, 128, 130 are only connected to other switches. Inner switches 124, 126, 128, 330 may or may not be OF switches.

Some embodiments of the present disclosure will be discussed as using the OpenFlow protocol, but could be implemented with other types of Software Defined Networking (SDN). OpenFlow is a communications protocol that gives access to the forwarding plane of a network switch or router over the network. OpenFlow 1.1 supports multiple tables and a metadata field to exchange information between tables. The present disclosure takes advantage of these features to reduce the number of rules by avoiding cross-products that occur when flattening multi-step classifications.

In a service network, an operator is able to define service policies that specify traffic classes and the chain of services that each class must traverse. These policies are translated by the controller into rules that are programmed on the switches in the service network. These rules steer the network traffic through the ordered chain of services as specified by the policies.

Embodiments of the present invention provide flexibility as they support the integration of existing and third party services with no modifications. Service instances can be located and chained in an arbitrary fashion by the operator, and each service instance can be part of multiple service chains. The ability to steer traffic at the granularity of subscribers and traffic types is also provided.

The approach as discussed herein provides scalability in three distinct manners. First, it reduces the number of rules required to be stored in a switch by avoiding rule cross-product and, instead, using multiple tables combined with metadata to communicate information between tables. Second, the load is distributed across a network of switches instead of using a single, centralized router or load balancer, while still maintaining central control. Third, expensive forwarding operations such as classification and header rewriting are pushed to the perimeter of the service network, which can be beneficial in many ways. These operations need to be performed only once between services, regardless of the number of switch hops between them. Additionally, the need for aggregated throughput is often less at the perimeter of the network where the traffic has been distributed onto a plurality of switches. The present invention, combined with the use of virtual appliances running on commodity servers, enables pushing all expensive operations onto the software switch running on the virtual machine monitor.

A forwarding plane can be designed that uses multiple tables to reduce the total number of rules needed to support a given set of service policies.

An encoding of the service path in a metadata field can be designed that supports a large number of service chains and supports multiple instances per service. The encoding can be flexible and allow each service to be scaled independently.

A network organization can be provided so that expensive operations such as classification and header rewriting only need to be done once between services, regardless of the number of switch hops between them.

The traffic steering mechanism as described herein makes the following assumptions about the configuration of the network and the type of traffic that traverses it. 1) Every service is connected to a switch using two ports. Similar to routers and bridges, inline services are by definition traversed by traffic so this is a natural requirement. The services need to have a clear notion of upstream and downstream traffic and require the use of two ports. 2) The Service Network is bounded by a single gateway on each end. A single router connects the access network to the Service Network and a single router connects the Service Network to the Internet. 3) All services are addressable at the Ethernet layer. Some services may behave like bridges and may violate this assumption. 4) All traffic going through the Service Network is subscriber traffic. 5) Terminating services such as Internet Protocol Security (IPSec) gateways and Content Delivery Network (CDN) servers, which are communication endpoints, are located on a separate subnet connected to one of the gateway nodes.

Figure 2:
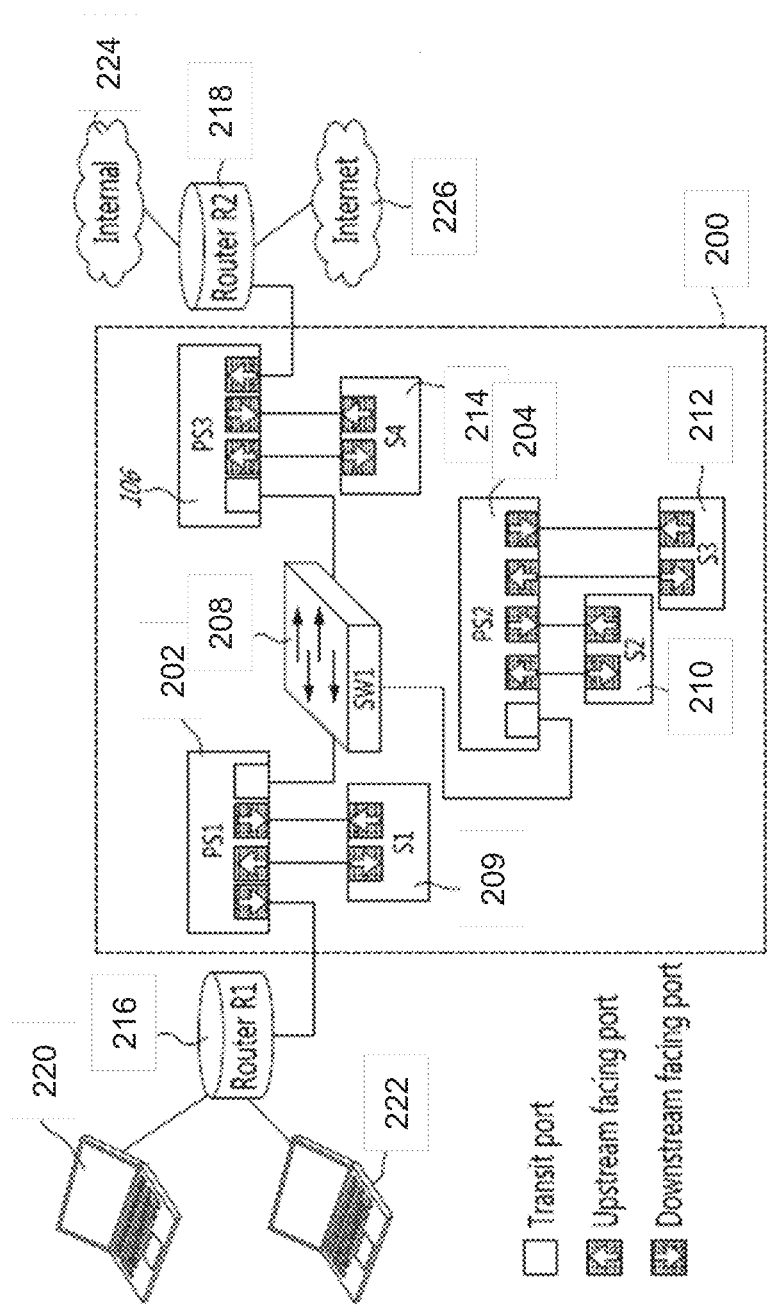
FIG. 2 illustrates an example service network, according to one embodiment.

FIG. 2 illustrates an example service network 200 that includes perimeter switches PS1 202, PS2 204, and PS3 206 at the perimeter of the network, and an inner switch SW1 208 at the interior of the network. Perimeter switches 202, 204, 206 can be implemented with OpenFlow switches, while the inner switch 208 can be implemented with either an OpenFlow switch or a plain Ethernet switch. Services (such as service nodes S1 209, S2 210, S3 212, S4 214) and routers (such as R1 216, R2 218) are all connected to the perimeter of the service network 200. The entire steering network is a single Layer 2 domain. There can be multiple instances of a service, and each service instance has two communication interfaces connected to the service network 200 (potentially on different switches), one for each traffic direction. Service instances with more than two interfaces are also supported by the proposed traffic steering mechanism.

Perimeter switches 202, 204, 206 can have two types of input/output ports: node ports and transit ports. Services and routers are connected to node ports. Transit ports connect to other perimeter switches or to inner switches. In the exemplary service network 200, each perimeter switch 202, 204, 206 has at least one upstream facing node port, at least one downstream facing node port and at least one transit port. Each service node S1 209, S2 210, S3 212, and S4 214 is connected to a perimeter switch. Perimeter switches 202, 204, 206 are connected via inner switch 208.

Inner switches, such as 208, include transit ports and simply forward traffic based on their destination Media Access Control (MAC) address. These switches could therefore be implemented with plain Ethernet switches. Optionally, there can be advantages to using OpenFlow switches in the inner service network 200 to enable features such as multi-path support.

Incoming traffic, either coming in from a gateway node (such as routers R1 216 and R2 218), or coming back from a service, always enters the service network 200 via a perimeter switch and through a node port. Packets arriving through node ports are processed and steered towards the next node (which can be a service or a gateway) in their assigned service paths. Packets arriving on transit ports are simply forwarded using their destination MAC address.

Router 216 can connect the service network 200 to user equipment 220 and 222. Router 218 can connect the service network 200 to an internal network 224 and/or the Internet 226.

Traffic steering is a two-step process. The first step classifies incoming packets and assigns them a service path based on predefined policies, e.g., subscriber, application, and ordering policies. The second step forwards packets to a next service based on its current position along its assigned service path. This two-step traffic steering process only needs to be performed once between any two nodes (service or router), regardless of the number of switches between them.

The traffic steering process described herein supports three types of service policies: subscriber-based policies, application-based policies, and flow-based policies. These policies can be specified by the operator and pushed to the relevant switches by a centralized controller, e.g., controller 110.

Subscriber-based policies are policies that are defined on a per subscriber basis. These policies specify the IP address of the subscriber and the set of services that each particular subscriber's traffic should traverse.

An application represents an end-user Internet application such as Youtube™, a type of traffic such as Hypertext Transfer Protocol (HTTP), or a combination of both. These types of policies are defined either in terms of an IP address block and/or a User Datagram Protocol (UDP)/Transmission Control Protocol (TCP) port. They are specified on a per application basis and apply to all subscribers. Application-based policies refine subscriber-based policies by adding or removing services from the set of services specified in the subscriber-based policies.

Flow-based policies are policies specific to a single flow or IP 5-tuple (i.e. source IP address, destination IP address, protocol, source port, destination port). They are used to dynamically override subscriber and application policies for specific flows. The forwarding rules derived from these policies can be pushed dynamically by the controller, even mid-flow, effectively re-steering a flow towards a different set of services.

Additionally, service ordering policies can be supported. Service ordering policies are different than the three types of service policies described above. They do not specify a mapping between traffic and services but instead specify the relative ordering between services for each traffic direction (upstream and downstream). The controller can transform these relative orderings into a global ordering and can use this ordering to convert the sets of services specified in the service policies into ordered service chains.

The datapath that implements the steering mechanism of embodiments of the present invention involves a number of table lookups. Additionally, information about services, for example, identity, topological location, and performance type can be provided to a steering module, e.g., using a northbound application programming interface (API) of the steering module.

End user services orchestration in cloud computing is built on a single hardware base, e.g., a server blade. Network services tend to be less well characterized by clean orchestration solutions because they consist of a mix of virtual appliances, implementations on optimized server hardware, and specialized hardware dedicated to a particular service. The present disclosure provides orchestration of network services taking into account a heterogeneous hardware and software base.

The steering module uses OpenFlow to steer packets between services. This removes the need for specialized code in the service implementations. The steering module includes a northbound API that provides the identity, topological location, and performance type of services. Previously, the steering module implementations assumed that services were at fixed locations and read the locations from a file. The network services orchestration module itself supports a northbound API that allows the network operator to specify that services should be started or stopped so the operator can control them. Within the network services orchestration module, a service instance management submodule is responsible for managing the service based on the operator's instructions provided by the API, given the existing hardware, bare metal software, and virtual appliance base. The service instance management submodule uses libvirt or the hypervisor control API to manage virtual appliances and specialized hardware APIs for the hardware and bare metal server instances. An autoscaling and power management submodule handles scaling up services that are experiencing increasing load and scaling down services where the load is decreasing. Since the present disclosure provides for management of both virtual and physical instances, a scale up for an idled hardware instance can take place by initiating power up of the hardware instance, utilizing a virtual appliance for the first few flows while the hardware instance is booting up, then moving traffic to the hardware instance when it power up is complete.

Figure 3:
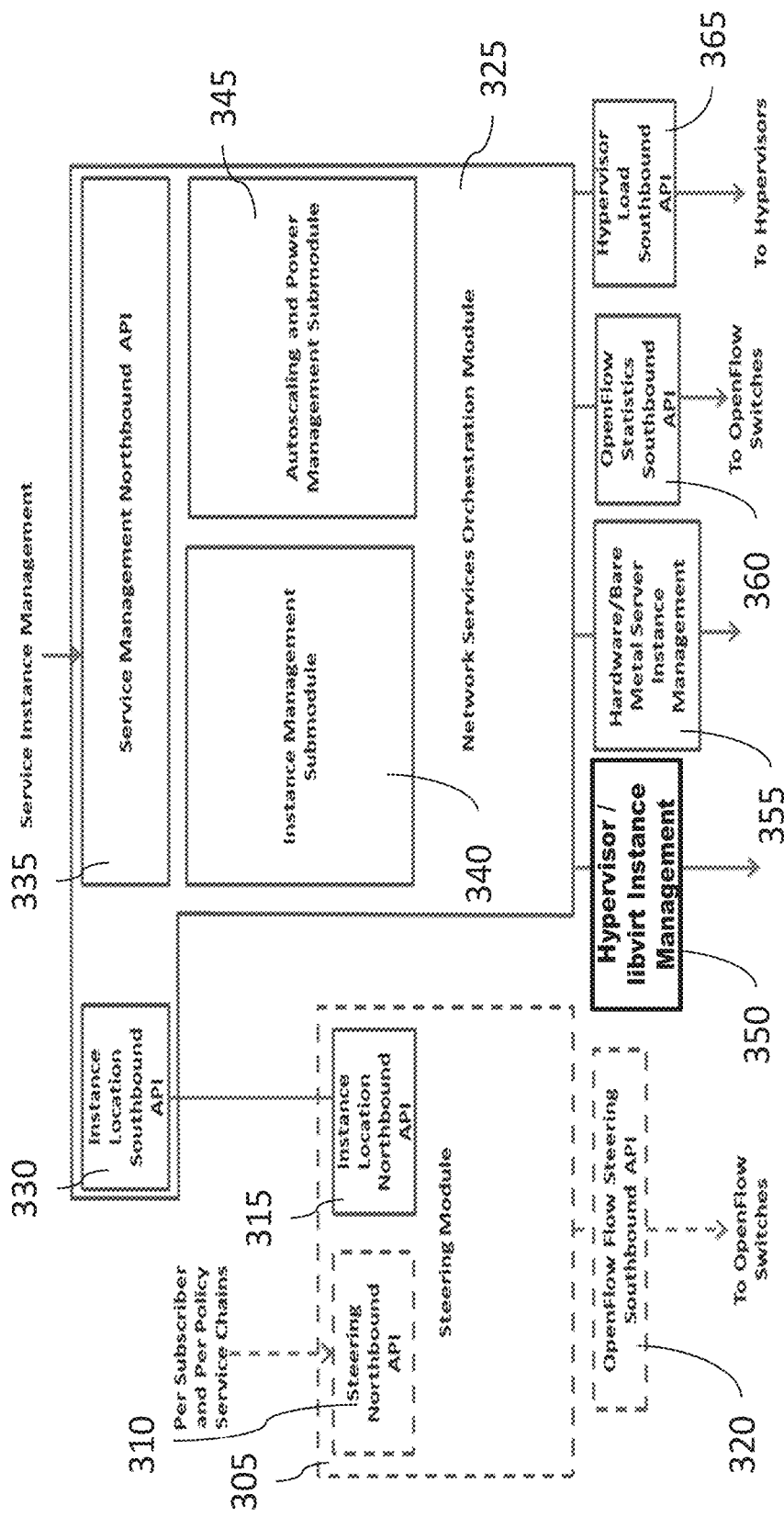
FIG. 3 illustrates a block diagram of an apparatus for providing network services orchestration, according to one embodiment.

FIG. 3 illustrates a block diagram of an apparatus for providing network services orchestration, according to one embodiment. FIG. 3 includes a steering module 305 and a network services orchestration module 325.

Steering module 305 includes a steering northbound API 310 and an instance location northbound API 315. The steering northbound API 310 allows subscriber-based and policy-based rules to be pushed down to the steering module. The instance location northbound API 315 allows changes in deployed network services instance availability to be pushed down to the steering module 305 by the network services orchestration module 325. The instance location northbound API 315 provides identity, topological location, and performance type service data to the steering module 305. A flow steering southbound API 320 is coupled to the steering module 305 and pushes the rules and deployed network services instance availability to one or more switches.

Network services orchestration module 325 includes an instance location southbound API 330, a service management northbound API 335, an instance management submodule 340, and an autoscaling and power management submodule 345. The network service orchestration module 325 implements network service startup and shutdown, and handles autoscaling of services.

The instance location southbound API 330 pushes changes in deployed network services instance availability down to the steering module 305. The instance location southbound API 330 provides identity, topological location, and performance type service data to the steering module 305.

A service management northbound API 335 specifies service data for a network operator. The service management northbound API 335 provides the network operator with a convenient API for specifying service instance pools, service instances, and their performance types. The service management API allows the operator to specify services for management. The API has the following calls: manage service, unmanage service, modify pool scalability parameters, and pool maximum reached.

The manage service API call, for example, uses the following command:
  manage_service<pool name,performance class, location, scaling KVL>

The manage service API call manages a service pool of type pool name having a certain performance class. The location parameter describes where the executable for the service is located and will depend on the performance class. For example:
  If the service is implemented as a hardware appliance, then the location will be a <switch,port> tuple where the appliance is connected to the network.
  If the service is a bare metal instance or a router service blade instance running directly on a server, then the location will be a <switch,port> tuple where the server is connected to the network or where the service blade is located. An optional image name may be included if the image must be auto-installed on the server or blade prior to booting it.
  If the service is a virtual appliance, then the location will be the image name, including the repository (for example, the NFS directory) where the image is located. Alternatively, if the service requires multiple images, then the location is a service description file containing the names and locations of all the images that constitute the service.
  The scaling parameter contains a list of key value (KVL) pairs describing upper and lower limits on resource consumption of various types before a new instance needs to be started or a withdrawn instance added back to the pool of active instances. Some examples are:
    queue_size: Number of pending requests in the input queue
    CPU_cycles: Number of CPU cycles consumed by a VM
    instance_quota_<upper,lower>: An upper and lower limit on the instance quota for virtual appliances
    flows: Number of flows currently being serviced by the instance
    power_manage: Power mange the pool by shifting flows off of underutilized instances and shutting them down.

The unmanage service API call, for example, uses the following command:
  unmanage_service<pool name>

The unmanage service API call stop routing flows and shuts down all instances for a pool name.

The modify pool scalability parameters API call, for example, uses the following command:
  modify_pool_scalability_parameters<pool name,scaling KVL>

This API call modifies the scalability parameters for the pool, using the new key value pair list.

The pool maximum reached API call, for example, uses the following command:
  pool_maximum_reached<pool name>

The pool maximum reached API call is an upcall issued by the Autoscaling and Power Management Submodule when a service pool has reached its maximum instance allocation. The calling entity can then take appropriate action, e.g., issue a warning message or call modify_pool_scalability_parameters< > to allow more instances to be scheduled.

An instance management submodule 340, in response to operator requests incoming from the service management northbound API 335, manages VMs and specialized APIs. The instance management submodule 340 utilizes libvirt or the hypervisor control API to manage VMs implementing virtual appliances, and specialized APIs for managing hardware based service instances and instances implemented on bare metal servers.

The Instance Management API communicates the availability of service instances between the Network Services Orchestration module and the Flow Steering Module. The API has three different calls: add, delete, and withdraw.

The add API call, for example, uses the following command:
  add<pool name, instance name, performance class, switch, up_port, down_port>

This API call adds service instance instance name to service pool pool name, with performance class performance class. The service instance is located at switch and upstream port (up_port), downstream port (down port). The two ports are needed for detecting traffic going in both upstream and downstream directions. In one embodiment, the switch could be a virtual switch or a distributed virtual switch.

The delete API call, for example, uses the following command:
  delete<pool name, instance name>

This API call shifts all flows destned for instance name to another instance and removes the former instance from further flow steering. The former instance will be shut down.

The withdraw API call, for example, uses the following command:
withdraw<pool name, instance name>
The withdraw API call withdraws instance name from the instances eligible for further flow steering but does not remove existing flows. The instance is currently at maximum capacity.

The performance class parameter in the add call can be defined in a number of ways depending on the available hardware and data center support. Examples of some possible performance classes are:

Virtual appliance

Hardware appliance

Bare metal server appliance; and

Router service blade deployed.

An autoscaling and power management submodule 345 monitors statistics and affects service instances. Affecting service instances includes scheduling new instances and shutting down instances having no load. This module monitors statistics from the OpenFlow switches and from the hypervisors running virtual service appliances.

A virtual instance management module 350 is responsible for starting and stopping virtual machines (VMs) on the hypervisors.

A hardware/bare metal server instance management module 360 is responsible for starting and stopping hardware instances and instances implemented directly on bare metal servers. The southbound APIs are hardware specific.

The OpenFlow flow steering module 320 and statistics module 360 handle the OpenFlow protocol to the switches, both flow steering and statistics.

A hypervisor load southbound API module 365 handles gathering load statistics from hypervisors.

Figure 4:
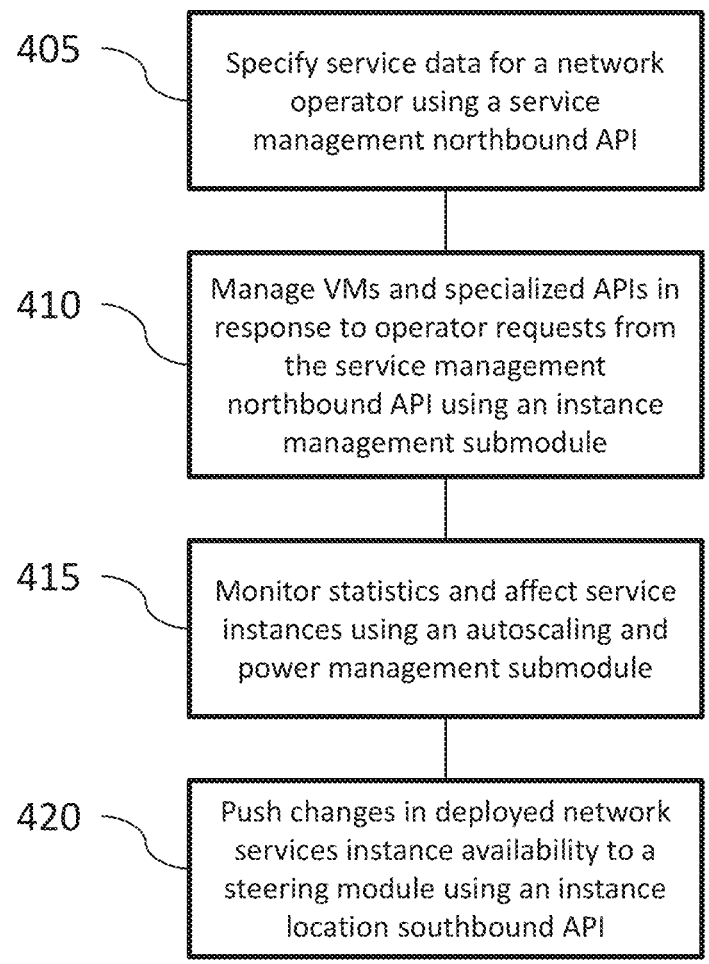
FIG. 4 illustrates a block diagram of a method for providing network services orchestration, according to one embodiment.

FIG. 4 illustrates a block diagram of a method for providing network services orchestration, according to one embodiment. Method 400 uses a network services orchestration module running on a network controller. At block 405, service data is specified for a network operator using a service management northbound application programming interface (API). In one embodiment, the specified service data includes at least one of service instance pools, service instances, and performance types. At block 410, virtual machines (VMs) and specialized APIs are managed in response to operator requests from the service management northbound API using an instance management submodule. In one embodiment, the hypervisor VM management API is used to manage VMs implementing virtual appliances. In one embodiment, a specialized API is used to manage service instances. The managed service instances can be hardware based service instances or instances implemented on bare metal servers.

At block 415, statistics are monitored and service instances are affected using an autoscaling and power management submodule. In one embodiment, statistics are monitored from hypervisors running virtual service appliances and switches. In one embodiment, affecting service instances includes scheduling new instances and shutting down instances having no load.

At block 420, changes in deployed network services instance availability are pushed to a steering module using an instance location southbound API. The instance location southbound API pushes the changes to an instance location northbound API of the steering module.

In one embodiment, a service instance is added to a pool of instances using the instance management submodule and load monitoring is set up using the autoscaling and power management submodule. This embodiment is explained in further detail in FIG. 5.

In one embodiment, returned statistics are compared to established upper and lower limits on a service pool using the autoscaling and power management submodule. This embodiment is explained in further detail in FIG. 6.

In one embodiment, when a service instance is marked as overloaded, the instance management submodule ends an instance that is a hardware or bare metal instance. When the instance is a virtual appliance, the instance management submodule starts a new virtual appliance or increases a number of virtual machines. This embodiment is explained in further detail in FIG. 7.

In one embodiment, the instance management module deletes a service instance when a number of flows is below a lower limit. This embodiment is explained in further detail in FIG. 8.

Virtual machines (VMs) are started and stopped on the hypervisors running on the servers using the virtual instance management module.

Hardware instances and instances implemented directly on bare metal servers are started and stopped using a hardware/bare metal server instance management module. The southbound APIs are hardware specific.

OpenFlow protocol to the switches, both flow steering and statistics, is handled using an OpenFlow flow steering module and an OpenFlow statistics module, respectively.

Load statistics are gathered from hypervisors using a hypervisor load southbound API module.

Figure 5:
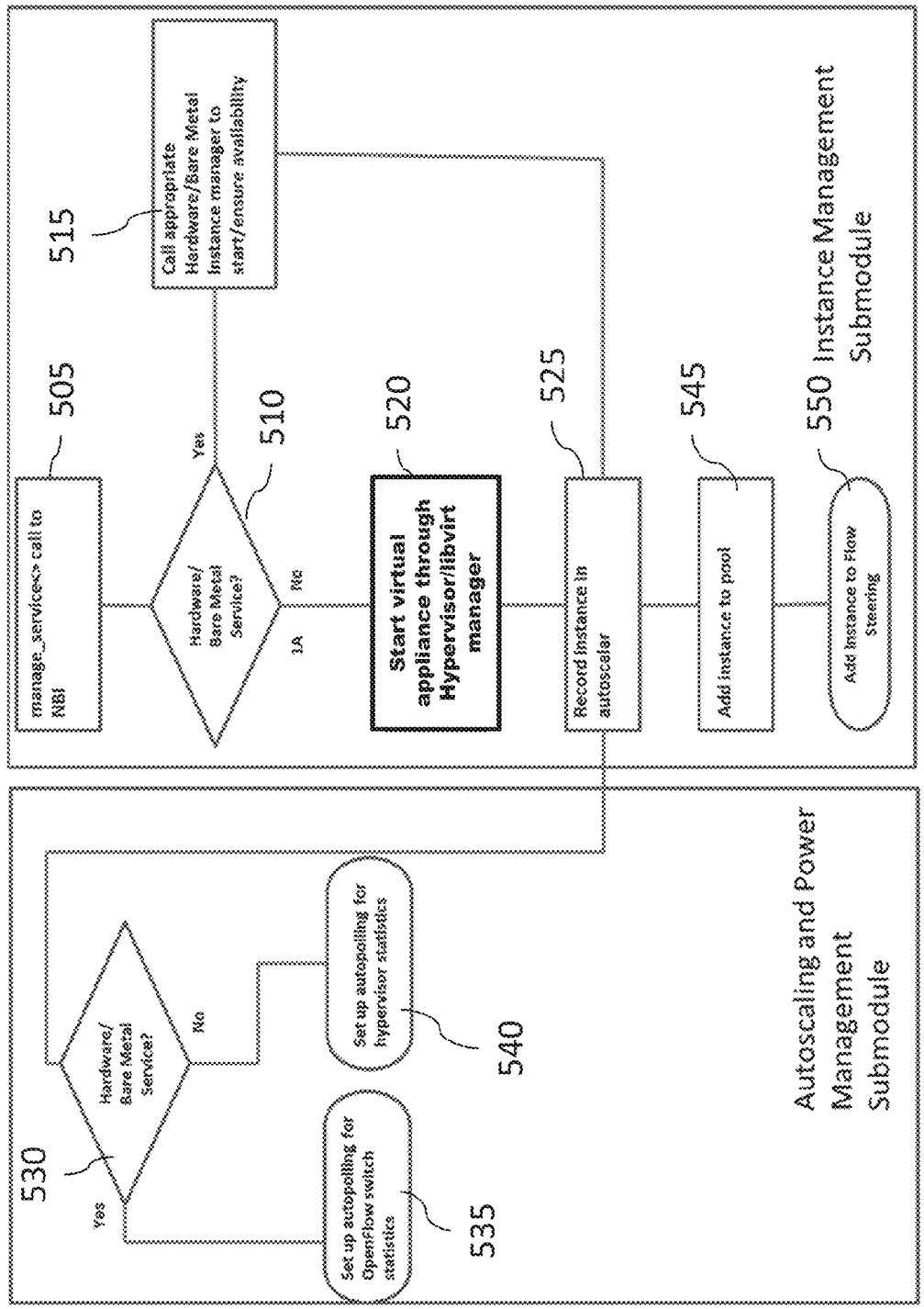
FIG. 5 illustrates the flow of operation when a manage service call arrives on a northbound interface (NBI) of the network services orchestration module, according to one embodiment.

FIG. 5 illustrates the flow of operation when a manage service call arrives on a northbound interface (NBI) of the network services orchestration module, according to one embodiment. At block 505, a manage_service<> call arrives on the NBI, i.e., service management northbound API 335. Depending on whether the service is deployed as a hardware/bare metal appliance or a virtual appliance, the Instance Management Submodule calls the appropriate instance manager plug-in. If the service is deployed as a hardware/bare metal appliance, the appropriate hardware/bare metal instance manager is called to start/ensure availability at block 515. If the service is deployed as a virtual appliance, a virtual appliance is started through the hypervisor control API or libvirt at block 520. The Instance Management Submodule then records the instance in the Autoscaling and Power Management Submodule, including the scaling parameters at block 525. Finally, the instance is added to the pool of instances and pushed to the Flow Steering module for receiving traffic at block 550.

The Autoscaling and Power Management Submodule sets up load monitoring at block 530 using either OpenFlow statistics, if the instance is a hardware/bare metal server appliance or through collecting hypervisor statistics. If the instance is a hardware/bare metal server appliance, autopolling is set up for Openflow switch statistics at block 535. Otherwise, autopolling is set up for hypervisor statistics at block 540. The autopolling functions periodically collect statistics from the instance and determine whether it is overloaded.

Figure 6:
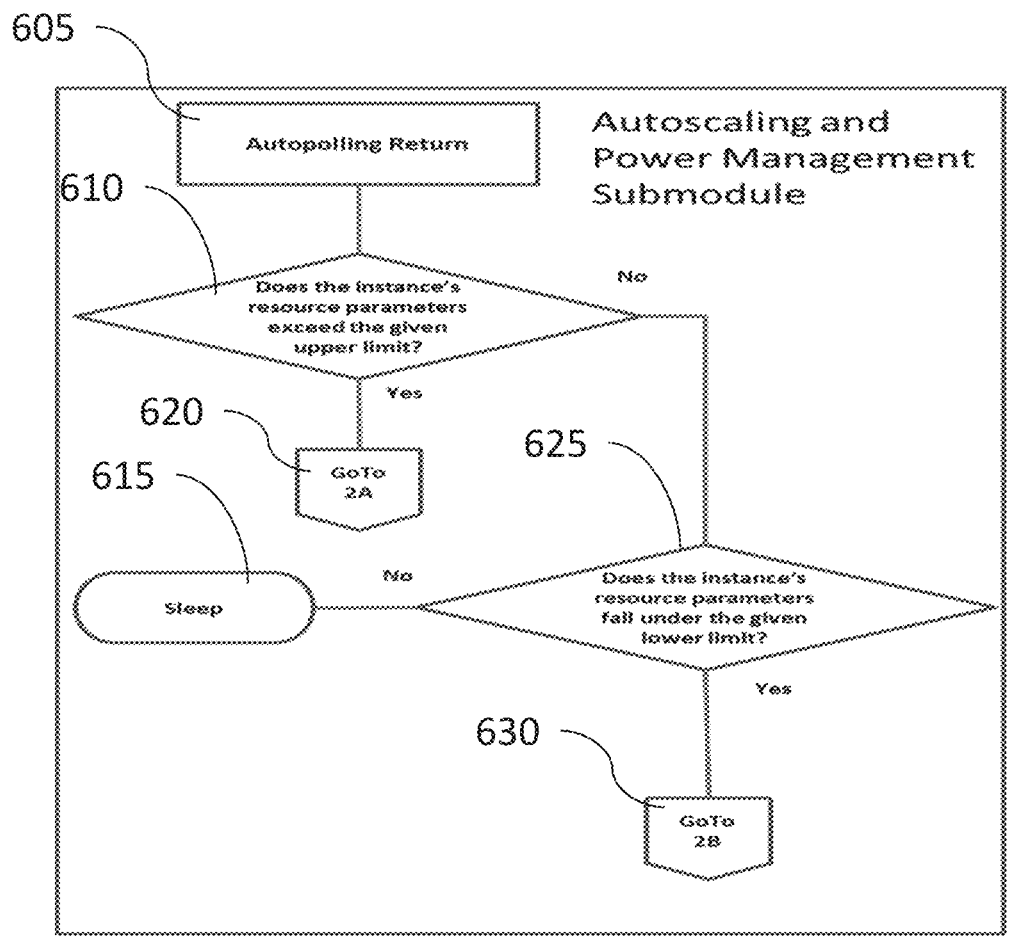
FIG. 6 illustrates how the Autoscaling and Power Management Submodule handles overloaded and underloaded instances, according to one embodiment.

FIG. 6 illustrates how the Autoscaling and Power Management Submodule handles overloaded and underloaded instances, according to one embodiment. The autopolling for OpenFlow switch and hypervisor statistics returns periodically with the values at block 605. The Autoscaling and Power Management Submodule compare these to the established upper and lower limits on the service pool at block 610. Depending on the values of these parameters, the instance is either put to sleep at block 615 or the procedure in the Instance Management Submodule shown in FIG. 7 or FIG. 8 is followed through blocks 620 or 630, respectively.

Figure 7:
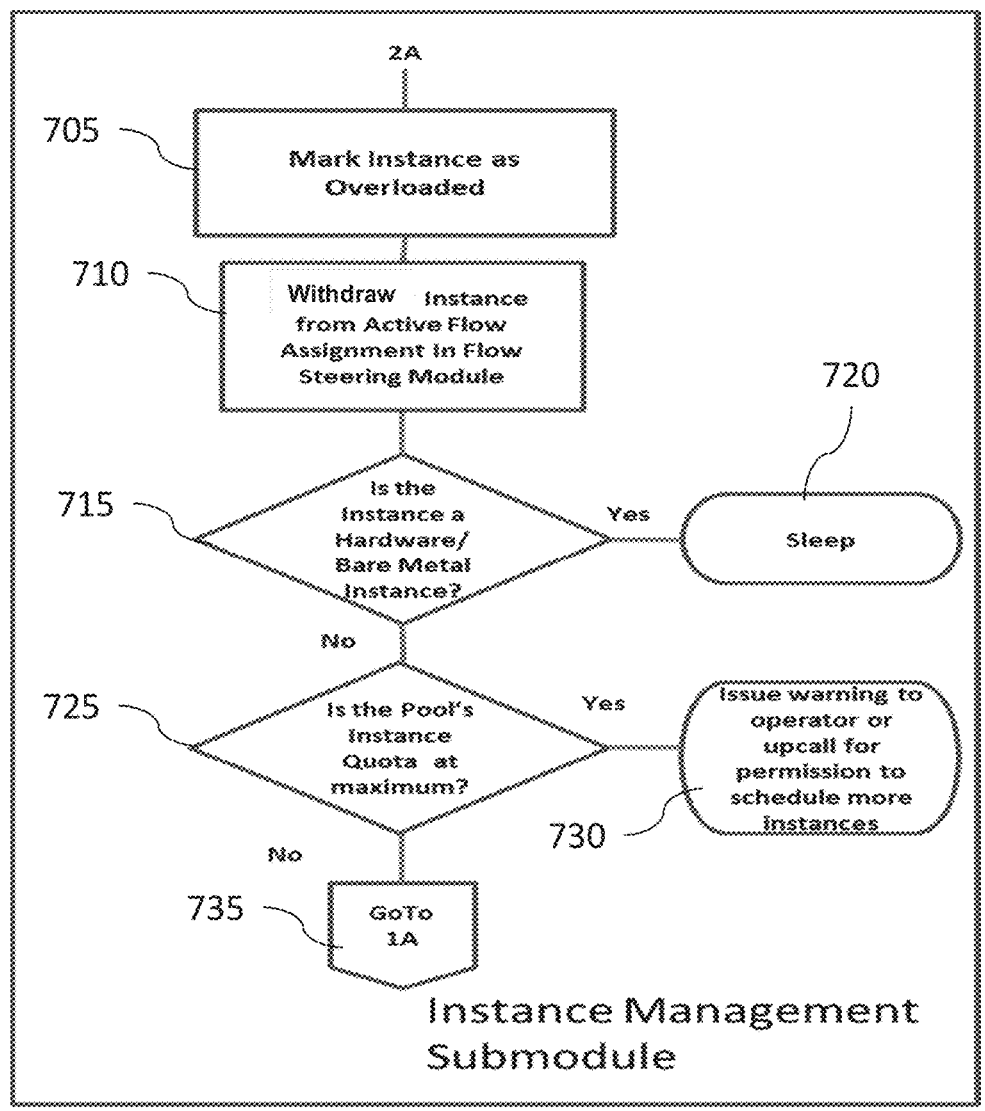
FIG. 7 illustrates the instance management procedure for an overloaded instance, according to one embodiment.

FIG. 7 illustrates the instance management procedure for an overloaded instance, according to one embodiment. The instance is marked as overloaded at block 705, then withdrawn from further flow assignment in the Flow Steering Module at block 710. If the instance is a hardware/bare metal instance, the procedure is put to sleep at block 720. If the instance is a virtual appliance, the pool's maximum VM quota is checked at block 725. If the quota is not at maximum, the procedure returns at block 735 to 1A in FIG. 5 to start a new virtual appliance. If the quota is reached, the pool_maximum_reached< > upcall is made to warn the operator to modify the pool parameters at block 730. The operator can then issue a modify_pool_scalability_parameters< > call to increase the number of VMs.

Figure 8:
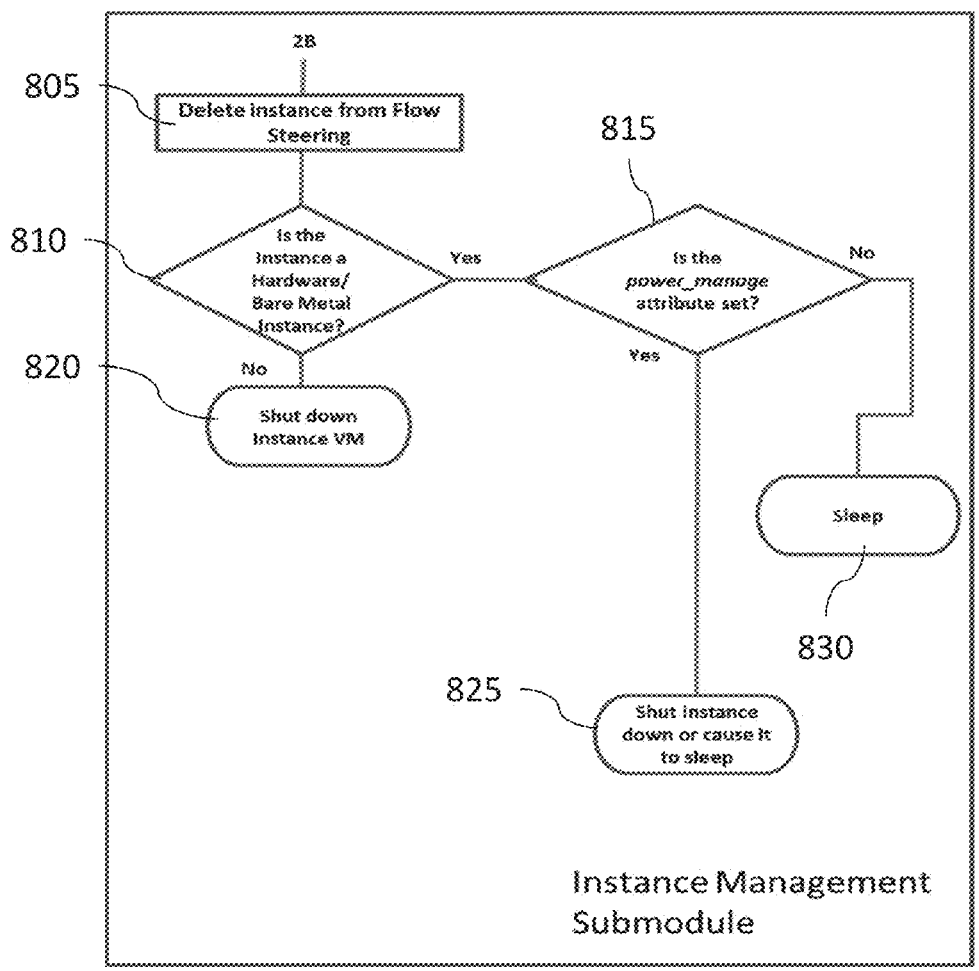
FIG. 8 illustrates the instance management procedure when the number of flows is below the lower limit, according to one embodiment.

FIG. 8 illustrates the instance management procedure when the number of flows is below the lower limit, according to one embodiment. In this case, the instance is deleted from the Flow Steering Module at block 805, which causes the Flow Steering Module to move active flows off to another instance. If the instance is a hardware/bare metal instance (determined at block 810) and the power management attribute is set (determined at block 815), the instance is shut down at block 825 or put to sleep at block 830. If the instance is a virtual instance, the VM is shut down at block 820.

Figure 9:
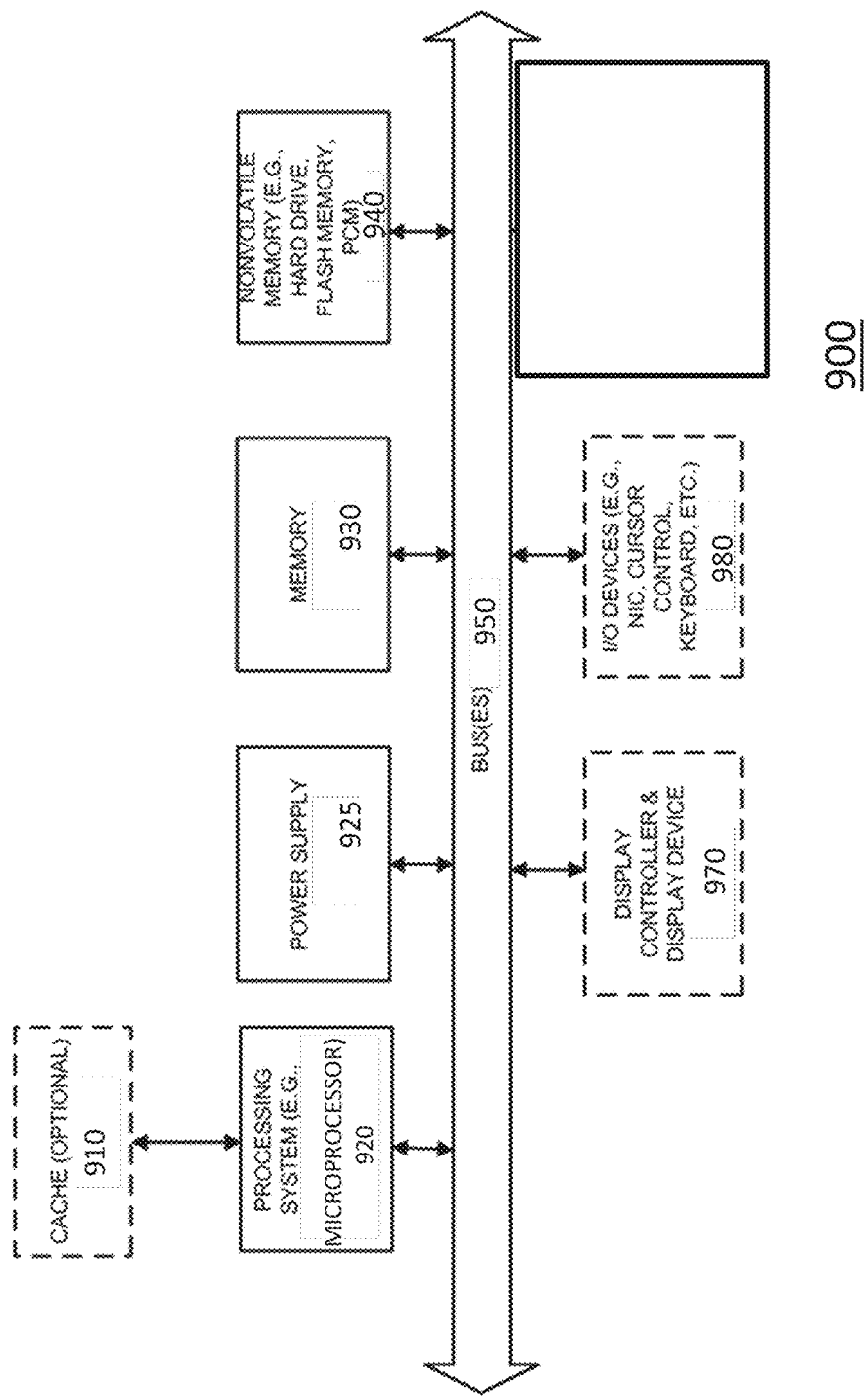
FIG. 9 illustrates a block diagram of an exemplary computer system according to embodiments of the invention.

FIG. 9 illustrates a block diagram of an exemplary computer system according to embodiments of the invention. The exemplary computer system 900 in FIG. 9 can be used to implement controller 110, components of FIG. 1, FIG. 2, and/or FIG. 3, including network services orchestration module 325, steering module 305, and/or any associated modules/APIs. Those skilled in the art would recognize that other computer systems used to implement this device may have more or less components and may be used in the disclosed embodiments.

The computer system 900 includes a bus(es) 950 that is coupled with a processing system 915, a power supply 920, volatile memory 925 (e.g., double data rate random access memory (DDR-RAM), single data rate (SDR) RAM), nonvolatile memory 930 (e.g., hard drive, flash memory, Phase-Change Memory (PCM). The processing system 915 may be further coupled to a processing system cache 910. The processing system 915 may retrieve instruction(s) from the volatile memory 925 and/or the nonvolatile memory 930, and execute the instruction to perform operations described above. The bus(es) 950 couples the above components together and further couples a display controller 970, one or more input/output devices 980 (e.g., a network interface card, a cursor control (e.g., a mouse, trackball, touchscreen, touchpad, etc.), a keyboard, etc.). In one embodiment, the display controller 970 is further coupled to a display device 975.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more buses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described. The description is thus to be regarded as illustrative instead of limiting.

What is claimed is:

1. An apparatus configured for providing network services orchestration, comprising:
a network controller, comprising one or more processors and one or more storage devices, configured to run a network services orchestration module that is configured to perform operations on flows of packets in real time prior to delivery of the packets to an end user or to an end user service, the network services orchestration module comprising:
a service management northbound application programming interface (API) configured to allow a network operator to specify services for management;
an instance management submodule that, in response to network operator requests from the service management northbound API, is configured to manage virtual machines (VMs) and specialized APIs;
an autoscaling and power management submodule configured to monitor statistics and affect service instances;
an instance location southbound API configured to push changes in deployed network services instance availability to a steering module, and,
the instance location southbound API is further configured to provide identity, topological location and performance type service data to the steering module.

2. The apparatus of claim 1, wherein the instance locations southbound API is configured to push the changes to an instance location northbound API of the steering module.

3. The apparatus of claim 1, wherein the specified services comprises at least one of service instance pools, service instances, and performance types.

4. The apparatus of claim 1, wherein a hypervisor VM management API is used to manage VMs implementing virtual appliances.

5. The apparatus of claim 1, wherein a specialized API is used to manage service instances.

6. The apparatus of claim 5, wherein the managed service instances comprise hardware based service instances.

7. The apparatus of claim 5, wherein the managed service instances comprise instances implemented on bare metal servers.

8. The apparatus of claim 1, wherein statistics are monitored from hypervisors running virtual service appliances and switches.

9. The apparatus of claim 1, wherein affecting service instances comprises scheduling new instances and shutting down instances having no load.

10. A method in an apparatus for providing network services orchestration, the method comprises:
running a network services orchestration module on a network controller, the network services orchestration module performs operations on flows of packets in real time prior to delivery of the packets to an end user or to an end user service, the network service orchestration module performs following steps:
allowing a network operator to specify services for management using a service management northbound application programming interface (API);
managing virtual machines (VMs) and specialized APIs in response to network operator requests from the service management northbound API using an instance management submodule;
monitoring statistics and affecting service instances using an autoscaling and power management submodule;
pushing changes in deployed network services instance availability to a steering module using an instance location southbound API; and,
providing identity, topological location and performance type service data to the steering module using the instance location southbound API.

11. The method of claim 10, wherein the instance location southbound API pushes the changes to an instance location northbound API of the steering module.

12. The method of claim 10, wherein the specified services comprises at least one of service instance pools, service instances, and performance types.

13. The method of claim 10, wherein a hypervisor VM management API is used to manage VMs implementing virtual appliances.

14. The method of claim 10, wherein a specialized API is used to manage service instances.

15. The method of claim 14, wherein the managed service instances comprise hardware based service instances.

16. The method of claim 14, wherein the managed service instances comprise instances implemented on bare metal servers.

17. The method of claim 10, wherein statistics are monitored from hypervisors running virtual service appliances and switches.

18. The method of claim 10, wherein affecting service instances comprises scheduling new instances and shutting down instances having no load.

19. The method of claim 10, which further comprises:
adding a service instance to a pool of instances using the instance management submodule; and
setting up load monitoring using the autoscaling and power management submodule.

20. The method of claim 10, which further comprises comparing returned statistics to established upper and lower limits on a service pool using the autoscaling and power management submodule.

21. The method of claim 10, wherein when a service instance is marked as overloaded, the instance management submodule:
ends an instance that is a hardware or bare metal instance; and
starts a new virtual appliance or increases a number of virtual machines when the instance is a virtual appliance.

22. The method of claim 10, the instance management module deletes a service instance when a number of flows is below a lower limit.

23. An apparatus configured for providing network services orchestration, comprising:
a network controller, comprising one or more processors and one or more storage devices, configured to run a network services orchestration module that is configured to perform operations on flows of packets in real time prior to delivery of the packets to an end user or to an end user service, the network services orchestration module comprising:
a service management northbound application programming interface (API) configured to allow a network operator to specify services for management;
an instance management submodule that, in response to network operator requests from the service management northbound API, is configured to manage virtual machines (VMs) and specialized APIs;
an autoscaling and power management submodule configured to monitor statistics and affect service instances;
an instance location southbound API configured to push changes in deployed network services instance availability to a steering module;
the instance location southbound API is further configured to provide identity, topological location and performance type service data to the steering module; and,
the network controller, comprising one or more processors and one or more storage devices, further configured to run the steering module, the steering module is configured to steer packets between services, the steering module comprising:
a steering northbound API configured to allow subscriber-based and policy-based rules to be received by the steering module;
an instance location northbound API configured to allow changes in deployed network services instance availability to be received by the steering module from the network services orchestration module; and,
the instance location northbound API further configured to allow identity, topological location and performance type service data to be received by the steering module from the network services orchestration module.

24. The apparatus of claim 23, further comprising a flow steering southbound API configured to push the rules and deployed network services instance availability to one or more switches.

25. A method in an apparatus for providing network services orchestration, the method comprising:
running a network services orchestration module on a network controller, the network services orchestration module performs operations on flows of packets in real time prior to delivery of the packets to an end user or to an end user service, the network service orchestration module performs the following steps:
allowing a network operator to specify services for management using a service management northbound application programming interface (API);
managing virtual machines (VMs) and specialized APIs in response to network operator requests from the service management northbound API using an instance management submodule;

monitoring statistics and affecting service instances using an autoscaling and power management sub-module;

pushing changes in deployed network services instance availability to a steering module using an instance location southbound API;

providing identity, topological location and performance type service data to the steering module using the instance location southbound API; and, running a steering module on the network controller, the steering module steers packets between services, the steering module performs the following steps:

allowing subscriber-based and policy-based rules to be received by the steering module using a steering northbound API;

allowing changes in deployed network services instance availability to be received by the steering module from the network services orchestration module using an instance location northbound API module; and, allowing identity, topological location and performance type service data to be received by the steering module from the network services orchestration module using the instance location northbound API.

26. The method of claim 25, further comprising a step of pushing the rules and deployed network services instance availability to one or more switches using a flow steering southbound API.

* * * * *

UNITED STATES PATENT AND TRADEMARK OFFICE
CERTIFICATE OF CORRECTION

PATENT NO. : 9,491,063 B2
APPLICATION NO. : 13/895141
DATED : November 8, 2016
INVENTOR(S) : Kempf et al.

Page 1 of 1

It is certified that error appears in the above-identified patent and that said Letters Patent is hereby corrected as shown below:

In the Drawings

In Fig. 8, Sheet 8 of 9, for Step "815", in Line 2, delete "power_manoge" and insert -- power_manage --, therefor.

In the Specification

In Column 2, Line 1, delete "(ACLS)" and insert -- (ACLs) --, therefor.

In Column 5, Line 44, delete "330" and insert -- 130 --, therefor.

In Column 10, Line 47, delete "(down port)." and insert -- (down_port). --, therefor.

In Column 11, Line 1, delete "appliance" and insert -- appliance; --, therefor.

In Column 11, Line 2, delete "appliance" and insert -- appliance; --, therefor.

In Column 11, Lines 14-15, delete "module 360" and insert -- module 355 --, therefor.

Signed and Sealed this
Twenty-fifth Day of September, 2018

Andrei Iancu
*Director of the United States Patent and Trademark Office*